(12) United States Patent
Vummadi et al.

(10) Patent No.: US 12,206,726 B2
(45) Date of Patent: Jan. 21, 2025

(54) CLOUD-BASED SFTP SERVER SYSTEM

(71) Applicant: Walmart Apollo, LLC, Bentonville, AR (US)

(72) Inventors: ManoharReddy Vummadi, Bangalore (IN); Ponsankar Shanmugam Semmandampalayam, Cupertino, CA (US); Xue Chen, Mountain View, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 101 days.

(21) Appl. No.: 17/557,118

(22) Filed: Dec. 21, 2021

(65) Prior Publication Data

US 2022/0224749 A1 Jul. 14, 2022

(30) Foreign Application Priority Data

Jan. 11, 2021 (CA) .................................. CA 3105553

(51) Int. Cl.
*H04L 67/06* (2022.01)
*G06F 9/455* (2018.01)
(Continued)

(52) U.S. Cl.
CPC .......... *H04L 67/06* (2013.01); *G06F 9/45558* (2013.01); *H04L 63/0815* (2013.01);
(Continued)

(58) Field of Classification Search
CPC . H04L 67/06; H04L 63/0815; H04L 67/1095; G06F 9/45558; G06F 2009/45579; G06F 2009/45587; G06F 2009/4559
See application file for complete search history.

(56) References Cited

U.S. PATENT DOCUMENTS

| 7,793,342 B1 * | 9/2010 | Ebrahimi | ............ H04L 63/0815 726/8 |
| 7,917,617 B1 * | 3/2011 | Ponnapur | ............ G06F 9/45558 718/1 |

(Continued)

FOREIGN PATENT DOCUMENTS

| CN | 110839001 A | 2/2020 |
| CN | 111491037 A | 8/2020 |

OTHER PUBLICATIONS

Unknown, "Couchdrop/Push Files to the Cloud with our AFTP/FTP/Rsync Server", https://couchdrop.io, Dec. 7, 2020, 26 pages.
(Continued)

*Primary Examiner* — Nicholas P Celani
*Assistant Examiner* — Wuji Chen
(74) *Attorney, Agent, or Firm* — Foley IP Law, PLLC

(57) ABSTRACT

Examples provide a cloud-based distributed secure shell (SSH) file transfer protocol (SFTP) server system for responding to client requests. A load balancer assigns client requests to available SFTP servers within the cloud based distributed SFTP server cluster. Each SFTP server is hosted on an individual VM associated with a cloud server. An authentication service authenticates the client requests using a single user profile. A registry table on a first cloud storage maintains metadata describing all the data records stored within a second cloud storage. The registry table and the data records are accessible to all the SFTP servers within the server cluster. In this manner, any server within the cluster can authenticate a user and respond to a client request while providing a seamless and uniform user experience while simultaneously reducing resource usage and improving scalability.

18 Claims, 15 Drawing Sheets

(51) Int. Cl.
*H04L 9/40* (2022.01)
*H04L 67/1095* (2022.01)

(52) U.S. Cl.
CPC ............... *H04L 67/1095* (2013.01); *G06F 2009/45579* (2013.01); *G06F 2009/45587* (2013.01); *G06F 2009/45595* (2013.01)

(56) References Cited

U.S. PATENT DOCUMENTS

| | | | |
|---|---|---|---|
| 8,171,201 B1* | 5/2012 | Edwards, Sr. | G06F 3/0613 711/170 |
| 8,180,735 B2* | 5/2012 | Ansari | H04L 12/2803 380/255 |
| 8,510,596 B1* | 8/2013 | Gupta | G06F 21/56 714/21 |
| 9,471,350 B2* | 10/2016 | Pavlas | G06F 9/45558 |
| 9,753,810 B1* | 9/2017 | Khandelwal | G06F 11/1446 |
| 10,114,705 B1* | 10/2018 | Kumar | G06F 11/1469 |
| 10,594,604 B1* | 3/2020 | Lohiya | H04L 45/74 |
| 10,839,389 B1* | 11/2020 | Cron, Jr. | G06Q 30/0603 |
| 10,880,312 B1* | 12/2020 | Mesard | H04L 63/08 |
| 11,080,396 B1* | 8/2021 | Easttom | H04L 63/145 |
| 11,201,915 B1* | 12/2021 | Mesard | H04L 67/1031 |
| 2006/0155912 A1* | 7/2006 | Singh | G06F 9/5088 711/6 |
| 2007/0266136 A1* | 11/2007 | Esfahany | H04L 41/22 709/223 |
| 2008/0177424 A1* | 7/2008 | Wheeler | G06F 9/5077 700/295 |
| 2009/0133018 A1* | 5/2009 | Kaneki | G06F 11/3442 718/1 |
| 2011/0185292 A1* | 7/2011 | Chawla | G06F 9/5077 709/227 |
| 2011/0225277 A1* | 9/2011 | Freimuth | G06F 9/45558 718/1 |
| 2012/0254370 A1* | 10/2012 | Bacher | H04L 67/00 709/219 |
| 2013/0007505 A1* | 1/2013 | Spear | G06F 11/2025 714/4.11 |
| 2013/0152047 A1* | 6/2013 | Moorthi | G06F 11/3664 717/124 |
| 2013/0254761 A1* | 9/2013 | Reddy | G06F 9/45558 718/1 |
| 2013/0275967 A1* | 10/2013 | Jenne | G06F 21/00 718/1 |
| 2014/0013112 A1* | 1/2014 | Cidon | G06F 16/182 713/165 |
| 2014/0019498 A1* | 1/2014 | Cidon | G06F 16/182 707/827 |
| 2014/0068732 A1* | 3/2014 | Hinton | G06F 21/41 726/6 |
| 2014/0095440 A1* | 4/2014 | Kamei | G06F 16/1844 707/652 |
| 2014/0181041 A1* | 6/2014 | Whitehead | G06F 11/1446 707/652 |
| 2014/0195516 A1* | 7/2014 | Balakrishnan | G06F 16/168 707/722 |
| 2014/0244618 A1* | 8/2014 | Lynch | G06F 16/41 707/769 |
| 2014/0337327 A1* | 11/2014 | Barton | G06F 16/24578 707/723 |
| 2014/0344267 A1* | 11/2014 | LeBert | G06F 16/972 707/736 |
| 2015/0277958 A1* | 10/2015 | Tanaka | H04L 43/0817 718/1 |
| 2015/0347542 A1* | 12/2015 | Sullivan | G06F 16/2455 707/602 |
| 2016/0080397 A1* | 3/2016 | Bacastow | H04L 63/10 726/1 |
| 2016/0124999 A1* | 5/2016 | González Brenes | G06F 16/213 707/803 |
| 2017/0017520 A1* | 1/2017 | Nakazawa | G06F 16/252 |
| 2017/0177867 A1* | 6/2017 | Crofton | G06F 21/565 |
| 2017/0364702 A1* | 12/2017 | Goldfarb | G06F 21/6218 |
| 2018/0121230 A1* | 5/2018 | Baset | G06F 11/3409 |
| 2018/0132105 A1* | 5/2018 | Nealis | G06F 21/10 |
| 2018/0204017 A1* | 7/2018 | Panchbudhe | H04L 9/3242 |
| 2020/0090278 A1* | 3/2020 | Christensen | G06Q 40/04 |
| 2020/0117724 A1* | 4/2020 | Xin | G06F 16/903 |
| 2020/0167373 A1* | 5/2020 | Siddiqui | G06F 16/2228 |
| 2021/0026807 A1* | 1/2021 | Jeong | G06F 16/164 |
| 2021/0136569 A1* | 5/2021 | Obaidi | H04W 12/37 |
| 2021/0191839 A1* | 6/2021 | Ozawa | G06F 11/3476 |
| 2021/0279001 A1* | 9/2021 | Kanno | G06F 3/0604 |
| 2021/0349887 A1* | 11/2021 | Alonzo | G06F 16/284 |
| 2022/0188467 A1* | 6/2022 | Lee | H04L 63/0815 |
| 2022/0224749 A1* | 7/2022 | Vummadi | H04L 67/06 |
| 2023/0254292 A1* | 8/2023 | Chen | H04L 63/123 713/168 |
| 2023/0254372 A1* | 8/2023 | Chisolm | G06F 21/64 709/203 |

OTHER PUBLICATIONS

Unknown, "Configure a Single Sign-on Connection to an AFTP Server", https://www.ibm.com/support/knowledgecenter/en/SS6PNW_3.4.2/com.ibm.help.ssp.scenarios.doc/sftp_sfo_proxy/ssp_sfo_cfgsso.html, Dec. 7, 2020, 3 pages.

Arwidmark, Johan, Setting up a FTP Server in the cloud—Microsoft Azure vs. Amazon Web Service, https://deploymentresearch.com/setting-up-a-ftp-server-in-the-cloud-microsoft-azure-vs-amazon-web-services/, Jun. 21, 2017, 8 pages.

Unknown, "Use SFTP to transfer files", Indiana University, https://kb.iu.edu/d/akqg, Dec. 7, 2020, 4 pages.

* cited by examiner

| Column name | Data type | description |
|---|---|---|
| user_name  1202 | text | Sftp username |
| outbound_folder_path  1204 | text | Folder path for user to list or fetch data |
| file_name  1206 | text | File name user stored |
| created_time  1208 | timestamp | Meta data created time |
| file_path  1210 | text | Path to retrieve data from cloud storage |
| status  1212 | text | CREATED or DELETED |

```
{
  "username": "dsv_bridge",
  "servername": "dsv_bridge_server1",
  "public_keys": " " }
```

```
{
    "header": null,
    "payload":
    {
        "email": 'dsv@example.com',
        "enabled": true,
        "id": null,
        "locked": false,
        "loginUID": "dsv_bridge",
        "realmId": "CANADA_BEDROCK"
    }
}
```

FIG. 14

CLOUD-BASED SFTP SERVER SYSTEM

BACKGROUND

Traditional secure shell (SSH) file transfer protocol (SFTP) servers provide file access, file transfer and file management services using a client-server model. These systems typically utilize individual servers storing files and other data on local physical data storage. These traditional SFTP servers provide only limited availability. Moreover, they are typically not scalable or fault tolerant due to hardware limited capacity.

SUMMARY

Some examples provide a computer-implemented method for responding to client requests via a set of cloud-based distributed Secure Shell (SSH) file transfer protocol (SFTP) servers. A load balancer assigns an incoming client request to an available SFTP server within a set of servers associated with a cloud based distributed SFTP server cluster. The available SFTP server resides on an individual virtual machine (VM) associated with a cloud server. The available SFTP server accesses a set of records in a centralized registry table associated with the user using user-provided data obtained from the client request. The set of records describing a set of files associated with the client request. The set of records stored on the centralized registry table is accessible to any SFTP server in the cloud based distributed SFTP server cluster. A set of file-related actions associated with at least one of the set of records stored on the registry table or the set of files stored on a cloud object storage are performed in response to the client request. The set of records in the registry table to reflect the performed set of file-related actions. A state of each file-related action performed with regard to a file stored on the cloud storage is maintained on the centralized registry table providing stateless cloud VMs.

Other examples provide a system for responding to client requests via a cloud based distributed SFTP server cluster. The system includes a processor communicatively coupled to a memory. A load balancer assigns an incoming client request to an available SFTP server within a set of servers associated with a cloud based distributed SFTP server cluster. An interceptor accesses a set of records from a centralized registry table associated with the user via a network. The assigned SFTP server performs a set of file-related actions associated with at least one of the set of records stored on the registry table or the set of files stored on a cloud object storage responsive to the client request. A registry update performs an update of the set of records in the registry table to reflect the performed set of file-related action. A state of each file-related action performed with regard to a file stored on the cloud storage is maintained on the centralized registry table providing stateless cloud VMs.

Still other examples provide a computer storage media, having computer-executable instructions for responding to client requests via a cloud-based distributed secure shell (SSH) file transfer protocol (SFTP) server cluster that, when executed by a computer cause the computer to perform operations including assigning an incoming client request to an available SFTP server within a set of available servers associated with a cloud based distributed SFTP server cluster; accessing a set of records from a centralized registry table associated with the user based on user-provided data, the set of records describing a set of files associated with the client request; performing, via a network, a set of file-related actions associated with at least one of the set of records stored on the registry table or the set of files stored on a cloud object storage responsive to the client request; and updating the set of records in the registry table to reflect the performed set of file-related actions responsive to performance of the set of file-related actions associated with processing the client request. A state of each file-related action performed with regard to a file stored on the cloud storage is maintained on the centralized registry table providing stateless cloud VMs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 12 is an exemplary diagram illustrating a registry table.

FIG. 13 is an exemplary key-based authentication code.

FIG. 14 is an exemplary user-based authentication code.

Corresponding reference characters indicate corresponding parts throughout the drawings.

DETAILED DESCRIPTION

Figure 1:
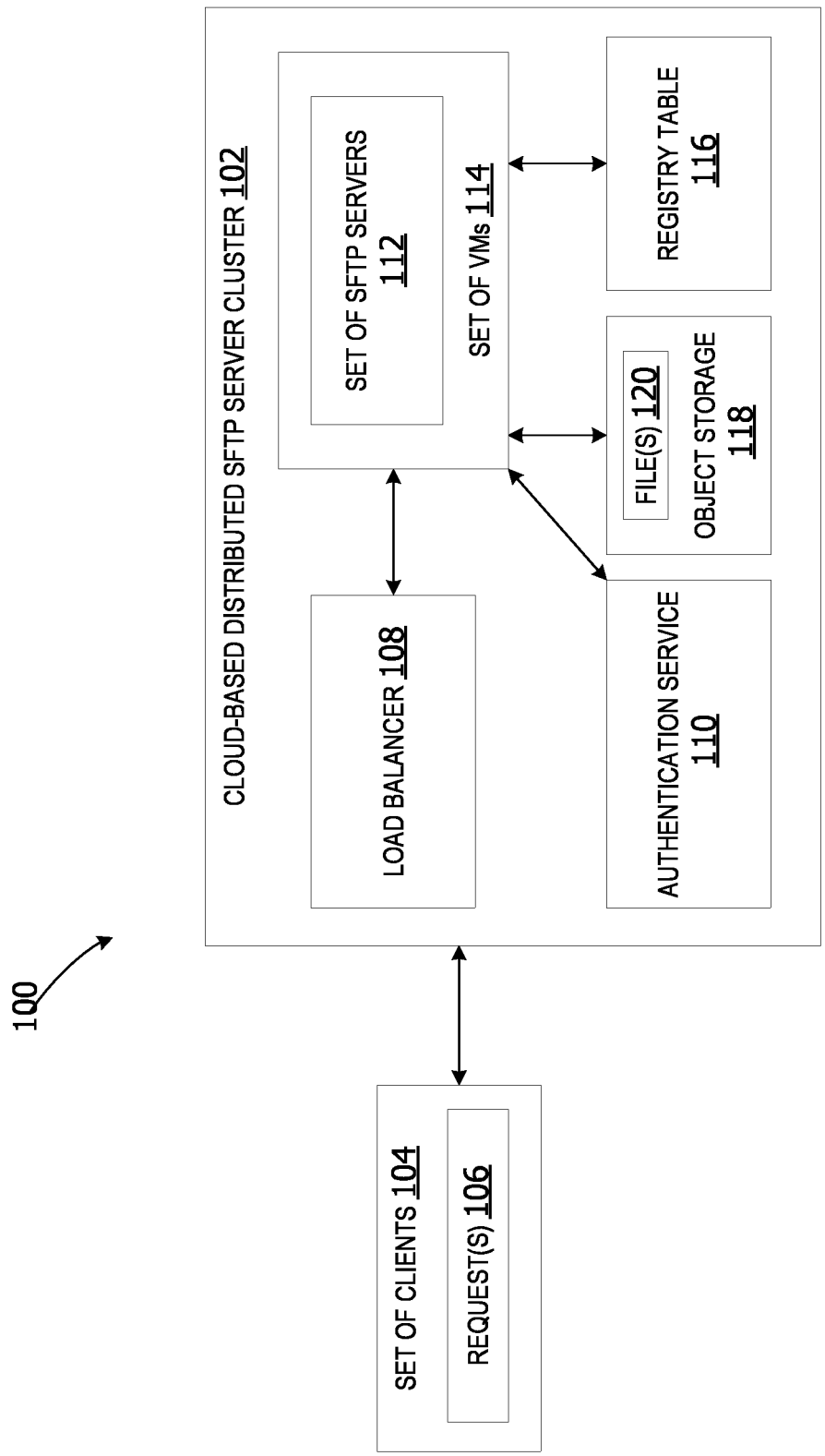
FIG. 1 is an exemplary block diagram illustrating a system for a cloud based distributed secure shell (SSH) file transfer protocol (SFTP) server cluster responding to client requests.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable a cloud based distributed secure shell (SSH) file transfer protocol server cluster for processing client requests, such as, but not limited to, get commands, put commands, read commands, and list commands. In some examples, a set of custom SFTP servers are provided in which each server resides on a VM behind a load balancer. These cloud based SFTP servers are not dependent on physical hardware. Therefore, the SFTP servers provide horizontal scalability in which SFTP servers may be added to the system or removed easily. In this manner, the system is robust and scalable.

In other examples, data such as the registry table and/or the files are stored on cloud storage. This minimizes local physical memory and data storage utilization by the SFTP servers. Reducing the amount of local storage utilized, conserves memory, reduces costs and improves scalability as the system is not dependent on physical memory or availability of local data storage hardware.

A centralized registry table is utilized in other examples. The centralized registry table maintains records associated with user files and locations of those files on the cloud storage. The centralized registry table is accessible to all the servers within the cluster, enabling any available server in the cluster to process any client request received by the system. This provides high availability of the servers while further making the system more robust, fault tolerant and reliable.

In yet other examples, a single sign-on (SSO) service is utilized to authenticate users and/or client requests. This enables the system to provide system access to a user using a single set of authentication credentials regardless of which server is assigned to process a given client request. The SSO service improves the user experience and simplifies the authentication process while ensuring data on the system is secure. This further improves scalability of the system while simultaneously providing a seamless and consistent end-user experience when interacting with the system, regardless of which server receives the client request.

Other aspects provide cloud SFTP servers that have no dependency on physical computing resources, such as data storage devices. This eliminates the need for a user to purchase expensive physical memory and/or physical storage for each SFTP server. This improves scalability while further reducing costs involved in setting up and maintaining the system.

In still other examples, data is streamed directly between the cloud-based object storage and the requesting client. This process elevation reduces the two-step process of transferring data from the client to the SFTP server and then on the data storage and vice-versa. Instead, the data flows directly to the client without going first to the SFTP server local storage in a single process. This improves efficiency and reduces processing time by at least fifty percent.

FIG. 1 is an exemplary block diagram illustrating a system 100 for a cloud based distributed secure shell (SSH) file transfer protocol (SFTP) server cluster 102 responding to client requests. In this example, the system 100 receives a client request from a client, such as a client in a set of one or more clients 104. The set of clients 104 represents one or more client user computing devices. A request in the one or more request(s) 106 received from the set of clients is a request to perform an operation on data, such as a data file. The request(s) 106 can include, for example but without limitation, a GET (read) request used to request data from a specified resource, a DELETE request used to delete data from a specified resource, a PUT (write) request used to write data to a specified resource and/or a LIST request used to request a list of resources. A LIST request is a request that triggers a LIST command.

A load balancer 108 monitors the health status of each server in a set of two or more SFTP servers 112. The load balancer 108 routes an incoming request from the set of clients 104 to an available server in the set of SFTP servers 112. The load balancer, in some examples, routes traffic among the available servers to ensure only working SFTP servers get incoming traffic, which helps to reduce server downtime. This provides improved resilience and fault tolerance of the SFTP servers.

As used herein, the term "available server" refers to a server that is working, has capacity to accept additional load(s) or otherwise has a healthy and operational status. An unavailable server is a server in the set of SFTP servers 112 that is down, inoperable, or unavailable to accept a new load because it is already operating at or near capacity handling one or more other loads.

Each server in the set of SFTP servers 112 is a cloud based SFTP server running in a virtual machine (VM) in a set of VMs 114. In other words, each server in the set of SFTP servers resides on its own, individual VM.

An authentication service 110 authenticates each incoming client request using authentication data provided by the client. In some examples, the authentication data includes a username, a password and/or a key, such as a public or private key. If the request is authenticated, the SFTP server assigned to handle the request proceeds with processing and responding to the request.

In some examples, the authentication is performed by a single sign-on (SSO) service. The authentication data is utilized by the SSO service to authenticate the client for processing by any server within the cloud based distributed SFTP server cluster.

In other examples, the SSO service provides uniform management of authentication procedures for all servers on the cluster. Any change to a user's authorizations is instantly applied uniformly to all the servers, eliminating the need to update each server separately. For example, if a user's credentials are terminated, indicating the user no longer has access to a resource, that update is enabled on the SSO service. In this manner, the user authentication data is rendered invalid for accessing the resources on all the servers because the SSO service no longer recognizes that authentication data as valid. This provides uniformity, faster updates, and improved security across the SFTP servers.

The assigned server in the set of available servers accesses a set of records in a centralized registry table 116 using user-provided data obtained from the client request. The registry table 116 is a table storing metadata describing one or more files in the cloud storage. The registry table, in some non-limiting examples, is implemented as a Cassandra database stored in a cloud storage system separately from the cloud object storage.

The set of records describes a set of one or more file(s) 120 associated with a specified resource. The set of records stored on the centralized registry table is accessible to any SFTP server in the cloud based distributed SFTP server cluster 102. The records in the registry table 116 include file names and a pointer which indicates the location of the file on a cloud-based object storage 118.

In other examples, file(s) 120 containing data associated with one or more resources are stored on the object storage 118. The object storage may also be referred to as a cloud storage or a cloud object storage.

The SFTP server assigned to the request performs a set of file-related actions associated with at least one of the set of records stored on the registry table or the set of files stored on a cloud object storage responsive to the client request. For example, if the request is a GET request, the assigned server retrieves the requested data from the object storage and streams the retrieved data to the requesting client. A GET request is a request that triggers a GET command.

In some examples, the requested data is streamed directly from the object storage 118 to the requesting client user device. In other words, the downloaded data is not stored or downloaded to local memory or physical storage associated with the assigned server. This reduces physical memory and data storage resource usage by the system.

In other examples, the SFTP servers do not utilize any physical local storage. Inbound and outbound data is streamed directly between the client and object storage through the live pipe. The term "live pipe" refers to a network tunnel or link created between the client and the data store. Hence the machine local storage usage by the SFTP servers is negligible or none at all.

In another example, if the request is a PUT request, the assigned server writes the requested data to the selected resource file. An entry in the registry table 116 associated with the selected resource file which is subject to the PUT request is updated to reflect the change to the file as a result of the write to the file. The update may include the date and/or time of the write, the name of the file, which was altered by the PUT command, the location of the file on the object storage 118, the username associated with the file, as well as any other user-configurable data.

In still another example, if the request is a delete request, the assigned server changes that status of the indicated resource file to DELETE in the registry table 116. Likewise, if the request is a LIST request, the assigned server obtains a list of the resources from the registry table 116 which is responsive to the request and returns the list to the requesting client in the set of clients. As shown above, the LIST request and/or the DELETE request may not require accessing the object storage as the relevant actions may be performed on the registry table 116 entries without uploading data to the object storage or downloading data from the object storage.

In response to completing performance of the set of file-related actions associated with processing the client request, the set of records in the registry table are updated to reflect the performed set of file-related actions, as discussed above. The centralized registry table stores a current state of each file-related action performed with regard to each file and/or each resource stored on the cloud storage.

In some examples, the system provides stateless cloud virtual machines having horizontal scalability. The metadata describing the state of each transaction performed with regard to data on the cloud storage is maintained in the registry table at a centralized storage which is accessible by all the SFTP servers. Adding or removing a node from the SFTP server cluster does not impact the operations. Thus, scaling up or down becomes dynamic and horizontal.

Figure 2:
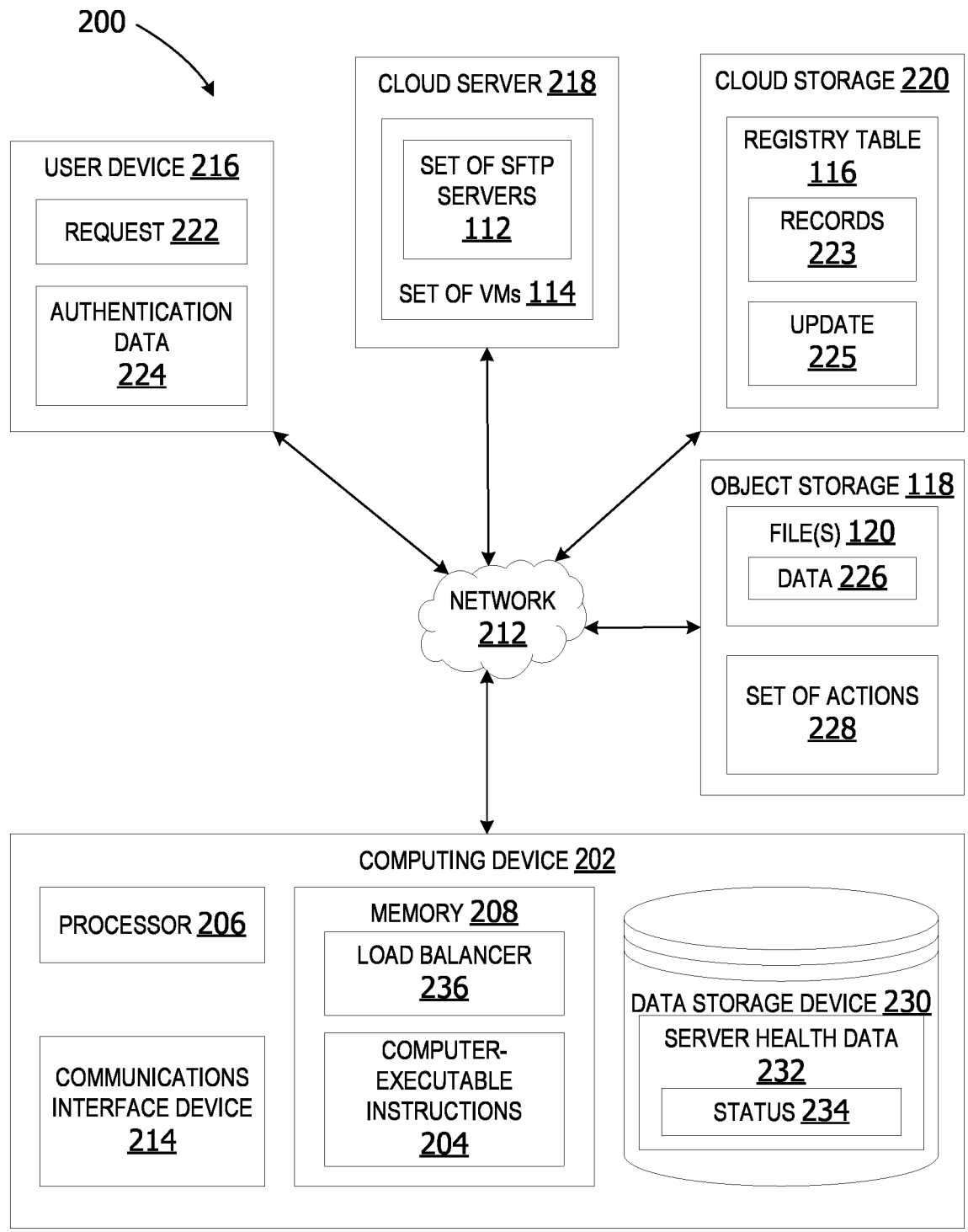
FIG. 2 is an exemplary block diagram illustrating a cloud based distributed SFTP server system.

Referring to FIG. 2, an exemplary block diagram illustrates a cloud based distributed SFTP server system 200. In the example of FIG. 2, the computing device 202 represents any device executing computer-executable instructions 204 (e.g., as application programs, operating system functionality, or both) to implement the operations and functionality associated with the computing device 202. The computing device 202, in some examples, includes a mobile computing device or any other portable device. A mobile computing device includes, for example but without limitation, a mobile telephone, laptop, tablet, computing pad, netbook, gaming device, and/or portable media player. The computing device 202 can also include less-portable devices such as servers, desktop personal computers, kiosks, or tabletop devices. Additionally, the computing device 202 can represent a group of processing units or other computing devices.

In some examples, the computing device 202 has at least one processor 206 and a memory 208. The computing device 202, in other examples, optionally includes a user interface device.

The processor 206 includes any quantity of processing units and is programmed to execute the computer-executable instructions 204. The computer-executable instructions 204 is performed by the processor 206, performed by multiple processors within the computing device 202 or performed by a processor external to the computing device 202. In some examples, the processor 206 is programmed to execute instructions such as those illustrated in the figures (e.g., FIG. 6, FIG. 7, FIG. 8, FIG. 9, FIG. 10, and FIG. 11).

The computing device 202 further has one or more computer-readable media such as the memory 208. The memory 208 includes any quantity of media associated with or accessible by the computing device 202. The memory 208 in these examples is internal to the computing device 202 (as shown in FIG. 1). In other examples, the memory 208 is external to the computing device (not shown) or both (not shown). The memory 208 can include read-only memory and/or memory wired into an analog computing device.

The memory 208 stores data, such as one or more applications. The applications, when executed by the processor 206, operate to perform functionality on the computing device 202. The applications can communicate with counterpart applications or services such as web services accessible via a network 212. In an example, the applications represent downloaded client-side applications that correspond to server-side services executing in a cloud.

The network 212 is implemented by one or more physical network components, such as, but without limitation, routers, switches, network interface cards (NICs), and other network devices. The network 212 is any type of network for enabling communications with remote computing devices, such as, but not limited to, a local area network (LAN), a subnet, a wide area network (WAN), a wireless (Wi-Fi) network, or any other type of network. In this example, the network 212 is a WAN, such as the Internet. However, in other examples, the network 212 is a local or private LAN.

In some examples, the system 200 optionally includes a communications interface device 214. The communications interface device 214 includes a network interface card and/or computer-executable instructions (e.g., a driver) for operating the network interface card. Communication between the computing device 202 and other devices, such as but not limited to a user device 216, a cloud server 218, a cloud storage 220 and/or the cloud-based object storage 118, can occur using any protocol or mechanism over any wired or wireless connection. In some examples, the communications interface device 214 is operable with short range communication technologies such as by using near-field communication (NFC) tags.

The user device 216 represent any client computing device executing computer-executable instructions. The user device 216 can be implemented as a mobile computing device, such as, but not limited to, a wearable computing device, a mobile telephone, laptop, tablet, computing pad, netbook, gaming device, and/or any other portable device. The user device 216 includes at least one processor and a memory. The user device 216 can also include a user interface device.

In this example, the user device 216 generates a request 222. The request 222 is a request to perform an action associated with a resource, such as one or more of the request(s) 106 in FIG. 1. The request may be a GET request, a PUT request, a DELETE request, a LIST request, or any other type of request to be performed on one or more of the file(s) 120 stored on the object storage 118. A PUT request is a request that triggers a PUT command to write data to the data store. A DELETE request is a request that triggers a DELETE command to update a file status to a deleted file status. The user device 216, in this non-limiting example, transmits the request 222 with authentication data 224 to the cloud based distributed SFTP server cluster.

The cloud server 218 is a logical server providing services to the computing device 202 or other clients, such as, but not limited to, the user device 216. The cloud server 218 is hosted and/or delivered via the network 212. In some non-limiting examples, the cloud server 218 is associated with one or more physical servers in one or more data centers. In other examples, the cloud server 218 is associated with a distributed network of servers.

In this non-limiting example, the cloud server 218 hosts the set of SFTP servers 112 running within the set of VMs 114. Each server in the set of SFTP servers runs on a separate VM. In this manner, the data on each SFTP server is isolated or sandboxed from the other servers for improved security.

The cloud storage 220 is a cloud-based data store storing a registry table 116. The registry table 116 stores a plurality of records 223. Each record includes entries associated with one or more file(s) 120 stored on the cloud-based object storage 118. A record can include information associated with a file, such as, but not limited to, a file name, location of the file on the object storage 118, status of the file, username associated with the file, etc. The status of the file can indicate if the file was deleted, or other actions in a set of actions 228 performed with regard to the file or data 226 in the file. Each time a file is accessed, updated, or otherwise altered; the system performs an update 225 on the record in the registry table 116 for the file.

The system 200 can optionally include a data storage device 230 for storing data, such as, but not limited to server health data 232. The server health data 232 indicates a status 234 of each server in the set of SFTP servers 112. The load balancer 236, in some examples, assigns incoming client requests to each SFTP server in the set of SFTP servers based on the status 234. If the status indicates a given server is unavailable (down or non-operational), the load balancer does not route any incoming requests to the unavailable server. As each server's status changes, the load balancer monitors the status changes and updates the server health data 232 to indicate which servers are available and which servers are unavailable.

The data storage device 230 can include one or more different types of data storage devices, such as, for example, one or more rotating disks drives, one or more solid state drives (SSDs), and/or any other type of data storage device. The data storage device 230, in some non-limiting examples, includes a redundant array of independent disks (RAID) array. In other examples, the data storage device 230 includes a database.

The data storage device 230, in this example, is included within the computing device 202, attached to the computing device, plugged into the computing device, or otherwise associated with the computing device. In other examples, the data storage device 230 includes a remote data storage accessed by the computing device via the network 212, such as a remote data storage device, a data storage in a remote data center, or a cloud storage.

In some examples, the load balancer 236 automatically receives periodic or scheduled status updates from the set of SFTP servers 112 via the network. In other examples, the load balancer 236 requests the status updates from the SFTP servers.

In this example, the load balancer 236 is implemented on the computing device while the set of SFTP servers 112 are implemented on the cloud server. In other examples, the set of SFTP servers 112 are implemented on the same computing device 202 with the load balancer 236. In still other examples, the load balancer 236 is implemented on the same cloud server 218 with the set of SFTP servers 112, such as is shown in FIG. 1 above.

Figure 3:
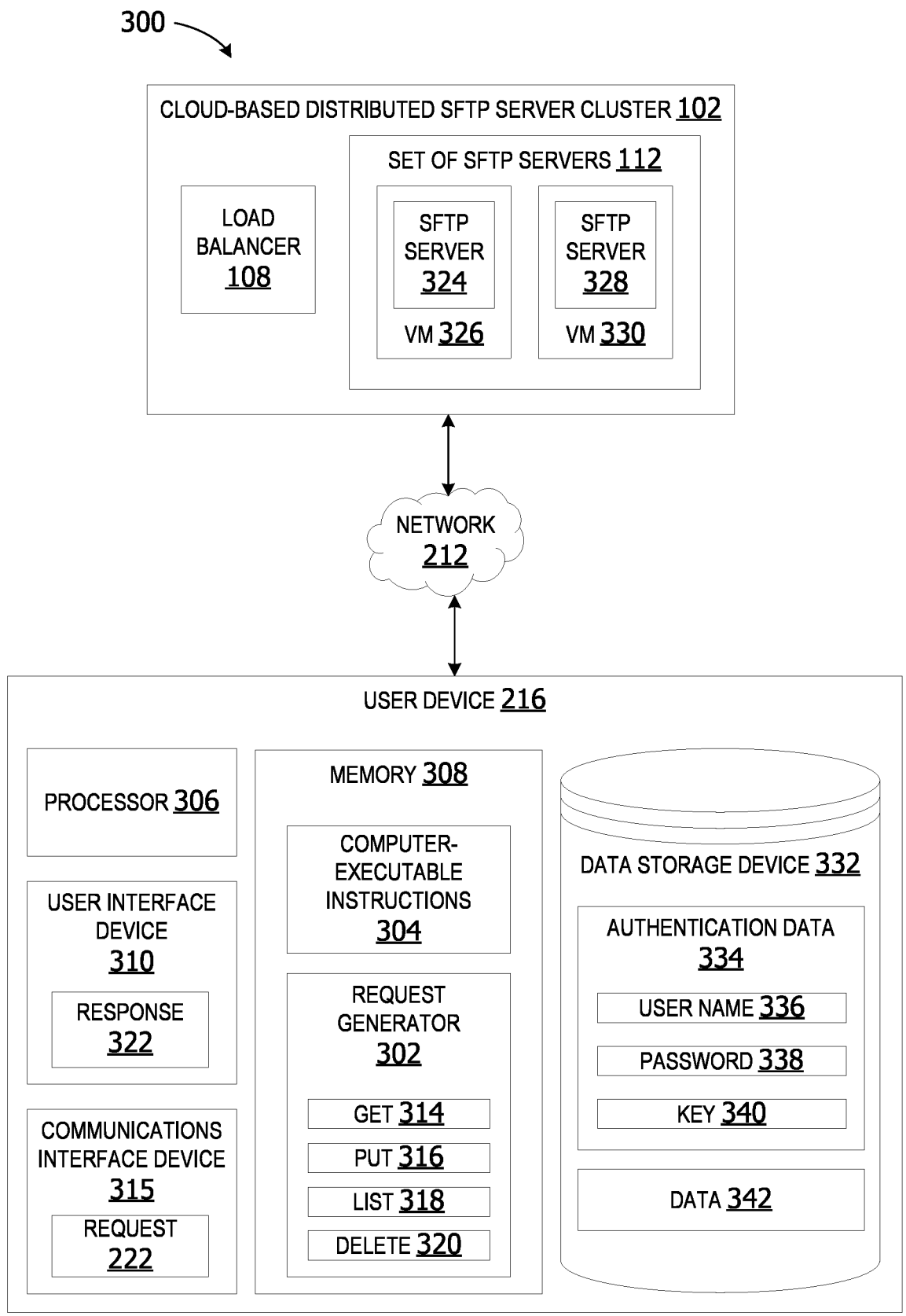
FIG. 3 is an exemplary block diagram illustrating a client computing device sending a request to the cloud based distributed SFTP server system.

Turning now to FIG. 3, an exemplary block diagram illustrating a client computing device sending a request 222 to the cloud based distributed SFTP server system 300 is shown. In this non-limiting example, the user device 216 represents any device executing computer-executable instructions 304 to implement the operations and functionality associated with the user device 216. The user device 216 may be implemented as a mobile computing device or any other portable device. A mobile computing device includes, for example but without limitation, a mobile telephone, laptop, tablet, computing pad, netbook, gaming device, and/or portable media player. The user device 216 can also include less-portable devices such as servers, desktop personal computers, kiosks, or tabletop devices.

In some examples, the user device 216 has at least one processor 306 and a memory 308. The user device 216, in other examples, includes a user interface device 310.

The processor 306 includes any quantity of processing units and is programmed to execute the computer-executable instructions 304. The computer-executable instructions 304 is performed by the processor 306, performed by multiple processors within the user device 216 or performed by a processor external to the user device 216.

The memory 308 stores data, such as, but not limited to, a request generator 302. The request generator 302 is an application that, when executed by the processor 306, operates to perform functionality on the user device 216. The request generator 302, in some examples, generators the request 222 transmitted to the cloud based distributed SFTP server cluster 102. The request 222 may include a GET 314 request, a PUT 316 request, a LIST 318 request and/or a DELETE 320 request.

In response to the GET 314 request, the interceptor checks a registry table to obtain a pointer to a cloud storage location storing data associated with the GET request in other examples. An input stream of the data is directed from the cloud storage location to the client side and not to the SFTP server. This enables utilization of very small VMs to host the SFTP server because the memory and storage requirements on the SFTP server are very small as the downloaded data does not reside on the SFTP server and the data is never downloaded onto the SFTP server's local storage.

In some examples, when a PUT 316 is received, the interceptor streams upload data into the cloud object storage. The system returns a pointer to the uploaded data back to the client for future use. An entry or record is created for the uploaded data file within the registry table. The created registry table record also includes the pointer. A notification of the successful completion of the upload may be returned to the client. This removes or reduces dependency on physical storage, such as disk or memory space because the uploaded file is never stored on the SFTP server's physical data storage or memory. Instead, the file is uploaded directly from the client to the cloud storage for improved efficiency, faster upload and reduced physical resource utilization.

In some examples, when a LIST 318 command requesting a list of folders or files is received, the interceptor performs a list command to retrieve the list of relevant files responsive to the request from the table registry based on the username. All records matching the username are retrieved from the registry table. The list is returned to the requesting client.

In response to receiving the DELETE 320 command requesting deletion of a selected file, the interceptor updates the status of the selected file in the registry table to indicate the file status is deleted in other examples. However, the file is not deleted. The file record remains available on the cloud storage for retrieval if the deletion command is rescinded at a later time.

In some examples, the user device 216 transmits the request 222 to the cloud based distributed SFTP server cluster 102 via the network 312. The load balancer 108 assigns the request 222 to an available server in the set of SFTP servers 112. In this example, both SFTP servers are available. Therefore, the request 222 may be assigned to either SFTP server 324 running on VM 326 or the SFTP server 328 hosted on the VM 330.

In this example, the set of SFTP servers 112 includes two SFTP servers running on two VMs. However, the examples are not limited to two servers in the cluster. The cloud based distributed SFTP server cluster 102 can include any number of servers running within any numbers of virtual machines. Thus, the set of SFTP servers can include three or more SFTP servers running on three or more VMs. In other words, the cluster can include a few servers, dozens of servers, or even hundreds of SFTP servers.

Once the assigned SFTP server completes processing of the request, the server returns a response 322 to the user device 216. The response 322 can include requested information, an acknowledgement that the requested action was performed, a notification that the requested action failed to complete, or any other information associated with the request. For example, if the request 222 includes a LIST request, the response 322 includes the list of files requested by the user. In another example, if the request is a DELETE request, the response includes a notification as to whether the deletion of the identified data was successfully completed.

In some non-limiting examples, the response 322 is presented to the user via a user interface device 310. The user interface device 310 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the user device 216 in one or more ways.

The network 312 is implemented by one or more physical network components, such as, but without limitation, routers, switches, network interface cards (NICs), and other network devices. The network 312 is any type of network for enabling communications with remote computing devices, such as, but not limited to, a local area network (LAN), a subnet, a wide area network (WAN), a wireless (Wi-Fi) network, or any other type of network. In this example, the network 312 is a WAN, such as the Internet.

In some examples, the system 300 optionally includes a communications interface device 315. The communications interface device 315 includes a network interface card and/or computer-executable instructions (e.g., a driver) for operating the network interface card. Communication between the user device 216 and other devices, such as but not limited to the cloud server hosting the cloud based distributed SFTP server cluster 102, can occur using any protocol or mechanism over any wired or wireless connection.

The system 300 can optionally include a data storage device 332 for storing data, such as, but not limited to authentication data 334 and/or user-provided data 342. The authentication data 334 is data provided by the client user device 216 to authenticate the request 222, such as, but not limited to, the authentication data 224. The request 222 may also be referred to as a command.

In some examples, the authentication data includes a username 336 and password 338. In other examples, the authentication data includes a username 336 and authentication key 340. The authentication data, in some examples, is submitted to the cloud based distributed SFTP server cluster for authentication by a SSO authentication service.

In some examples, the authentication service is a SSO service. In these examples, the end user can use single profile to access all SFTP servers in the cluster. The single profile can include the username, key, password, email and/or any other authentication data. User authentication is integrated through SSO. Hence the end user gets unified experience while accessing SFTP servers. Thus, any SFTP server can authenticate the client using the same user profile/authentication data.

The client generating the request and receiving the response, in this example, is implemented as a physical computing device. However, the examples are not limited to receiving data from and sending data to a client associated with a physical computing device. In other examples, the client may be implemented as a cloud-based client and/or a client which is hosted on a VM.

Figure 4:
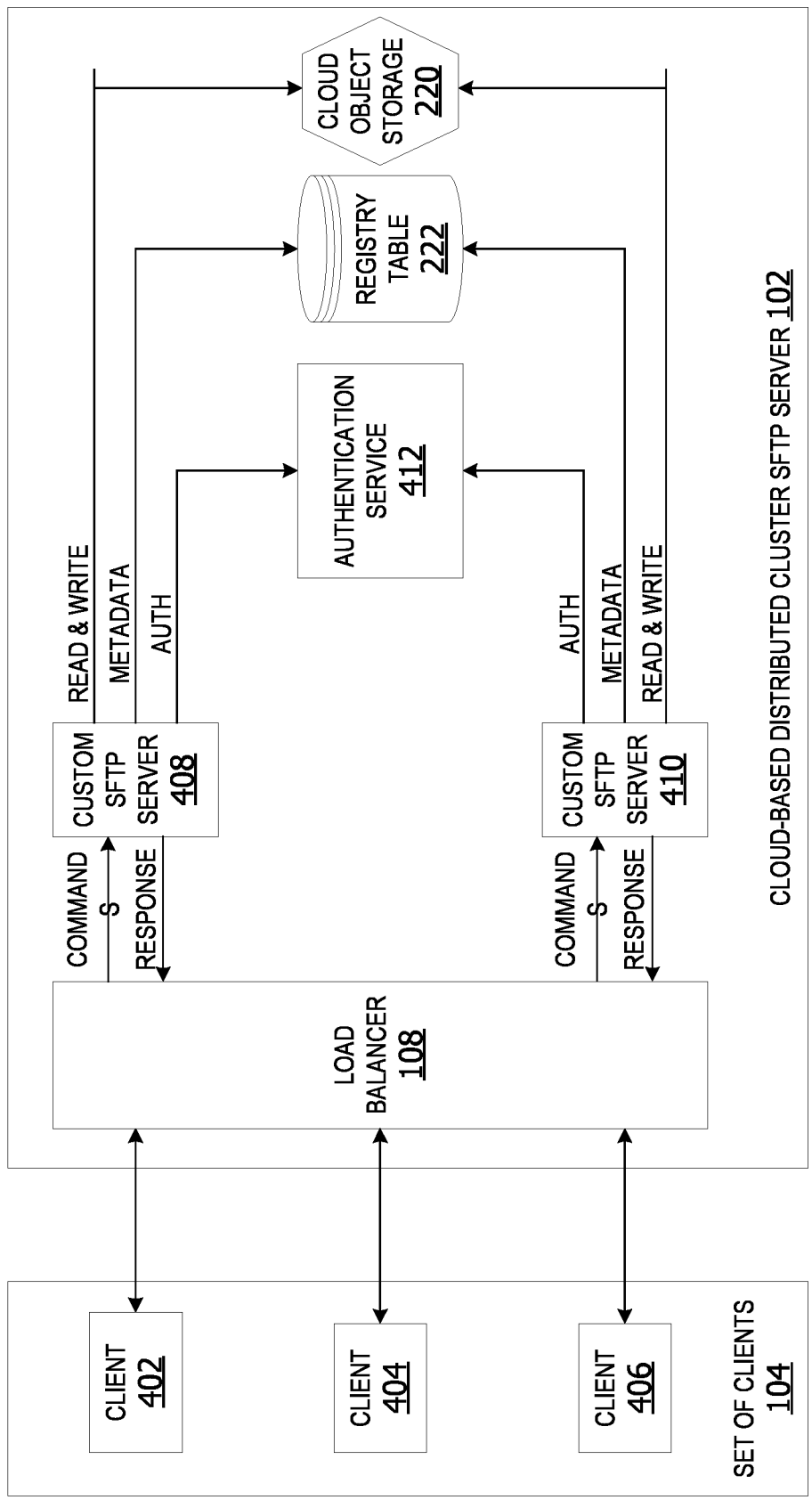
FIG. 4 is an exemplary block diagram illustrating a cloud based distributed server cluster for responding to requests from clients.

FIG. 4 is an exemplary block diagram illustrating a cloud based distributed server cluster 102 for responding to requests from clients. In this non-limiting example, a set of clients 104 submits one or more requests to one or more servers in the cloud based distributed SFTP server cluster 102. The set of clients 104 includes one or more clients. In this example, the set of clients 104 includes client 402, client 404 and client 406. When a client in the set of clients 104 transmits a request, the load balancer 108 intercepts the request and routes it to an available server.

The load balancer 108 selects a server from the set of SFTP servers based on which servers are available (healthy status). If more than one server is available, the load balancer may assign the request to a server using any known or available method for selecting servers. For example, the load balancer may utilize a round robin methodology for assigning requests to servers. The load balancer in other examples may utilize a performance-based methodology in which a load is assigned to the server in the set of servers which has the smallest load or the greatest available capacity to take on additional work. Requests may also be assigned based on priorities assigned to the servers, or any other system for assigning loads to servers.

Requests received from the set of clients 104 are transmitted to the selected custom SFTP server 408 or the SFTP server 410. In this non-limiting example, a first request received from the client 402 is assigned to the first custom SFTP server 408. A second request received from the second client 404 is routed to the second custom SFTP server 410 for processing. The customer SFTP server 408 and server 410 are servers in the set of SFTP servers, such as, but not limited to, the set of SFTP servers 112 in FIG. 1.

The authentication service 412 authenticates all requests received from all clients in the set of clients 104, regardless of which server is assigned to respond to the request. Thus, a first request routed to the customer SFTP server 408 and a second request assigned to the second custom SFTP server 410 are both authenticated by the authentication service 412.

Once a request is authenticated to verify the client is authorized to access the data in the cloud storage 220. In some examples, the authentication determines if the user has authorization to perform the requested action on the data. For example, a first user may be authorized to read (GET) data from a file but may not have authorization to write (PUT) to the data in the file. A second user may have full access, permitting the user to read, write, delete, or request a file list of all related files from the registry table 116 associated with the data.

The registry table 116 in this example is a database storing one or more registry tables containing metadata associated with the data in the cloud storage 220. In some examples, the registry table 116 is stored on a database on a first cloud storage while the file data is stored on an object storage in a different, second cloud storage. In other examples, the registry table 116 is stored on a database on the same cloud server as the cloud-based distributed cluster SFTP server, as shown in FIG. 4.

In some examples, a PUT command writes single or multiple files into the SFTP system. A client connects to one of the SFTP servers via the load balancer with the username. In some examples, all SFTP users login to a specific SFTP root folder. In some examples, the SFTP root folder is named: $sftp_root. After authentication, the client is redirected to the SFTP root folder associated with the username. In one example, the client is redirected to: "$sftp_root/{username}/." The client moves to the inbound folder and start to upload a file. The SFTP server monitors the status of the upload.

In other examples, after detecting the put command, the system uploads the file to cloud storage and returns the remote path for future reference. A new record is created in the registry table with metadata of this file. This feature enables the clients get their files from any servers because dependency on physical disk storage is removed. After the file is successfully stored in cloud storage, it is retrievable from all the SFTP servers. If a client is a disconnected from the server, the client can reconnect to load balancer and start to upload again.

In other examples, a DELETE command (DELETE request) enables a client to a file when if it is not in use. By deleting a file, the SFTP server performs a soft delete by setting the status of the particular record in registry table to a DELETED status. The deleted file remains in the cloud storage until expiration of a configurable time-to-live (TTL). However, the deleted file is not shown when list and get commands are called, but they are still available for recovery before the record in registry table or the file in object storage is deleted after the TTL expires.

In still other examples, a list command enables clients to list all files which they uploaded before using the list command. After detecting the list command, a list of operations is performed by the SFTP server before returning the result to clients. The first operation is to get the current path of the client. Then query registry table to fetch all records using username and current path and filter out the records with status CREATED. Created temporary files with the file names are returned, and the system outputs or otherwise present the list of file names to client.

A GET command, in still other examples, is used to download files from SFTP server to client local system. The get command involves getting the current path the client in. Then, query registry table to fetch record using username, current path, file name and status CREATED. If the record exists, stream data directly to the requesting client. This makes downloading faster than creating a temporary file on server for client to download, and also removed the dependency of single server capacity.

Figure 5:
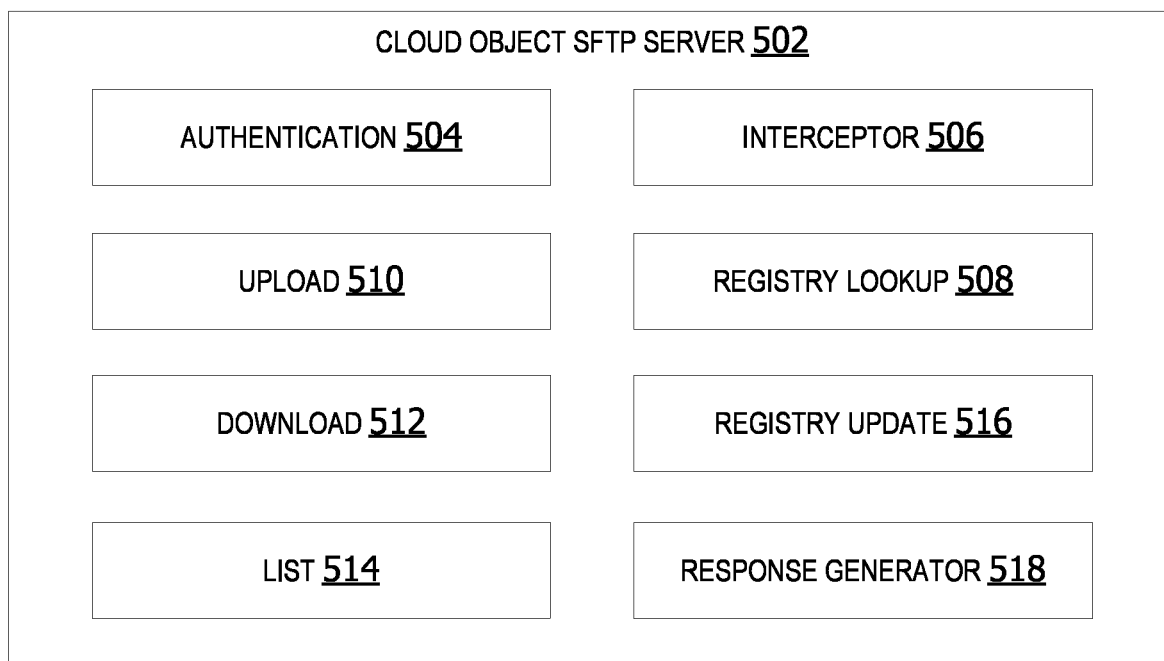
FIG. 5 is an exemplary block diagram illustrating a custom SFTP server.

FIG. 5 is an exemplary block diagram illustrating a custom SFTP server 502. The cloud object SFTP server 502 is a custom SFTP server in a set of SFTP clusters, such as, but not limited to, the SFTP server 408 and/or the SFTP server 410 in FIG. 4.

The cloud object SFTP server 502 in this example includes an authentication 504 engine which performs SSO authentication of incoming client requests to verify the requesting user is authorized to access the registry table and/or perform the requested commands on the data. The authentication 504 in this example is included on the SFTP server. In other examples, the authentication 504 is part of an authentication service on a cloud server separate from the SFTP server and the VM hosting the SFTP server.

An interceptor 506 is a command used to intercept received commands, such as GET commands, or PUT commands. In some examples, the interceptor logs changes to the data stored in the cloud object storage and/or determines whether the requesting client is authorized to execute a transaction on an object in the cloud object storage database.

The registry lookup 508 is a software component that checks the registry table using user-provided data in the client request to obtain the location of data in the cloud storage and/or obtain a list of files from the registry table entries responsive to the client request. In other words, the registry lookup 508 performs a lookup of information in the registry table that is required to respond to a given request.

Upload is a software component that uploads data to a file in the cloud storage. An upload can include changes to a file or creation of a new file, such as, but not limited to, data alterations or updates to a file associated with a PUT (write) command.

Download 512 is a software component that downloads data from a files stored in the cloud storage. The data is located based on a pointer in a registry table entry pointing to the storage location of the data to be downloaded. A download may occur in response to a GET (read) command.

Registry update 516 is a software component that performs an update to a registry table entry to reflect actions performed. A registry update 516 may include the date and/or time an action was performed, the type of action, location of the file, etc. A registry update 516 may also include adding a deleted status indicator to a file indicating that the user submitted a DELETE command requesting that the subject file be deleted.

LIST 514 is an operation that is performed in response to receiving a LIST command from a client. The LIST 514 operation compiles a list of one or more files from the registry table and submits that list to the requesting client in the response which is returned to the client. A response generator 518 generates a response to the client request. The response can include a data stream, a list, a confirmation of a file deletion, a confirmation of a completed write operation, etc.

Figure 6:
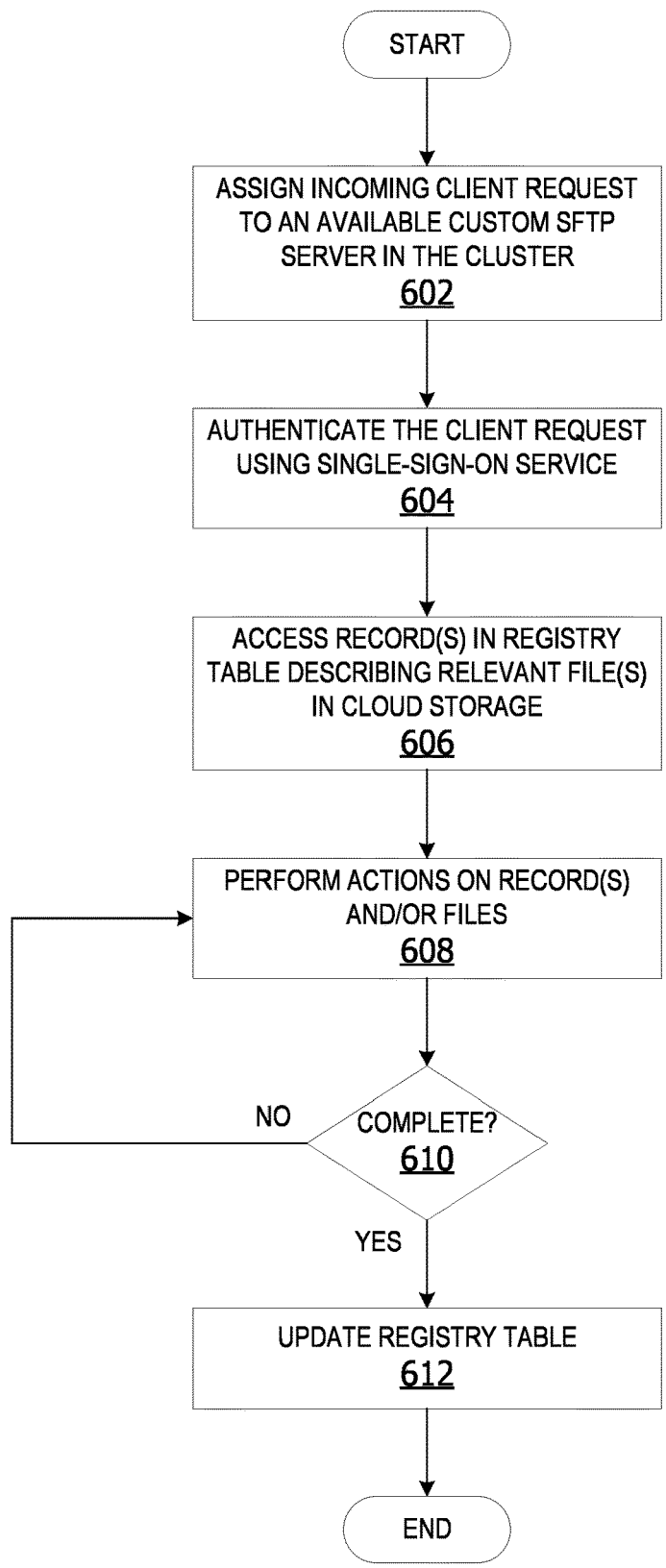
FIG. 6 is an exemplary flow chart illustrating operation of the computing device to process an incoming client request by a custom SFTP server in a cloud based distributed server system.

FIG. 6 is an exemplary flow chart illustrating operation of the computing device to process an incoming client request by a custom SFTP server in a cloud based distributed server system. The process shown in FIG. 6 is performed by a cloud based distributed SFTP server cluster, executing on a computing device, such as the cloud based distributed SFTP server cluster 102 in FIG. 1.

The process begins by assigning an incoming client request to an available custom SFTP server in the cloud based distributed SFTP server cluster at 602. The client request is authenticated using SSO service at 604. Record(s) in the registry table describing relevant file(s) in the cloud storage are accessed at 606. Actions are performed on the registry table record(s) and/or file(s) at 608. A determination is made whether requested action(s) to be performed on the record(s) or file(s) are complete at 610. If yes, the registry table is updated at 612. The process terminates thereafter.

While the operations illustrated in FIG. 6 are performed by a cloud service, aspects of the disclosure contemplate performance of the operations by other entities. In a non-limiting example, a computing device performs one or more of the operations. In another example, one or more computer-readable storage media storing computer-readable instructions may execute to cause at least one processor to implement the operations illustrated in FIG. 6.

Figure 7:
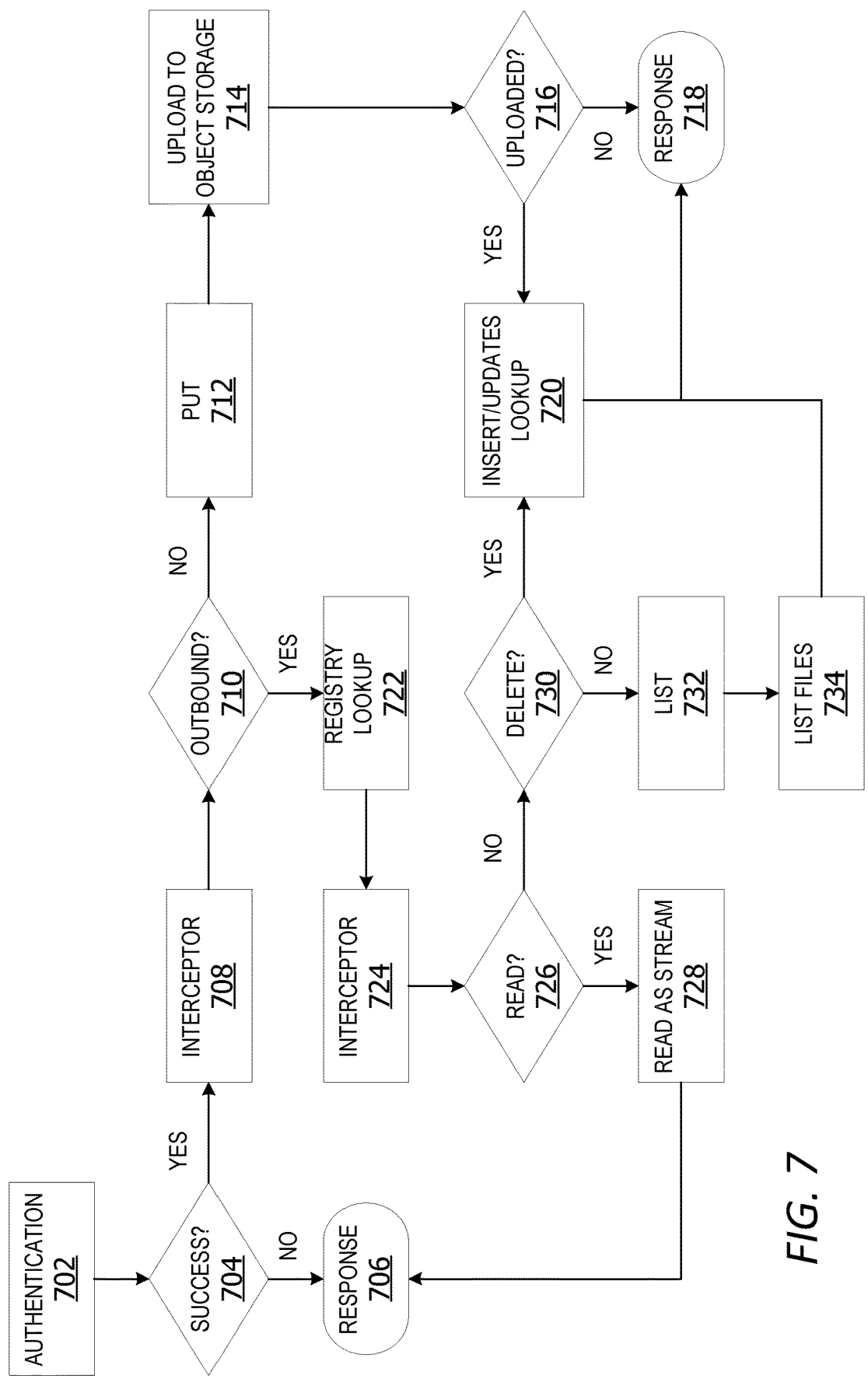
FIG. 7 is an exemplary flow chart illustrating operation of the computing device to process commands via a custom SFTP server.

FIG. 7 is an exemplary flow chart illustrating operation of the computing device to process commands via a custom SFTP server. The process shown in FIG. 7 is performed by a cloud based distributed SFTP server cluster, executing on a computing device, such as the cloud based distributed SFTP server cluster 102 in FIG. 1.

The process begins by authentication of a client request at 702. A determination is made whether the authentication is successful at 704. If no, a response 706 is generated and sent to the client indicating authentication failed.

If authentication is successful at 704, an interceptor 708 is deployed. A determination is made whether the request is an outbound request, such as a read, write, or list command. If no, the request is an inbound request which is identified as a PUT command at 712. The put command is performed by uploading the new data or data changes to the file(s) in the object storage at 712. A determination is made whether the data is uploaded at 716. If no, a response 718 is returned to the requesting client indicating the upload failed.

If the upload is successful at 716, an update is added or inserted into the registry table indicating the update to a pre-existing file or creation of a new data file in accordance with the PUT request. A response 718 is sent to the requesting client indicating the successful completion of the write task.

If the incoming request is an outbound request, the server checks the registry lookup 722 to identify file(s) associated with the username of the requesting user. An interceptor 724 is engaged. A determination is made whether the request is a read (GET) request at 726. If yes, the requested data is provided as a stream directly from the cloud storage to the client user device at 728. The response 706 is sent. The response may include the downloaded data and/or an acknowledgement of the completion of the read task.

If the request does not include a read request, a determination is made whether the request is a delete request at 730. If yes, the registry table entry for the file to be deleted is updated to indicate the file has been deleted. However, the original file remains stored on the cloud storage. This enables the administrator to restore the file is the user should request the deleted file be restored. A response 718 may be sent indicating the deletion was completed.

If the request is not a delete at 730, the outbound request is a list command 732. The server obtains a list of all the files which are responsive to the request at 734. The list is obtained from the registry table. The list is returned to the requesting client via the response 718.

While the operations illustrated in FIG. 7 are performed by a cloud service, aspects of the disclosure contemplate performance of the operations by other entities. In a non-limiting example, a computing device performs one or more of the operations. In another example, one or more computer-readable storage media storing computer-readable instructions may execute to cause at least one processor to implement the operations illustrated in FIG. 7.

Figure 8:
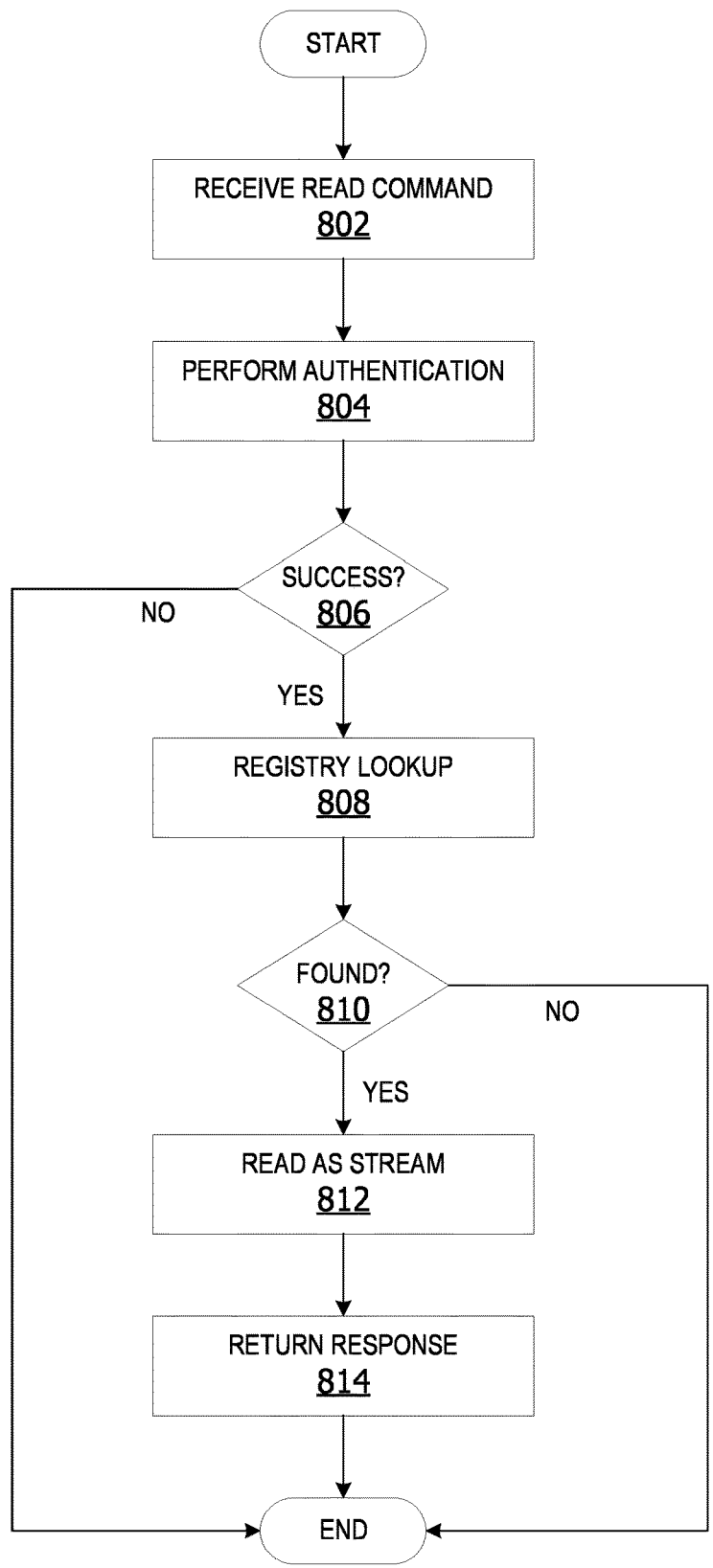
FIG. 8 is an exemplary flow chart illustrating operation of the computing device to process a read command by a custom SFTP server.

FIG. 8 is an exemplary flow chart illustrating operation of the computing device to process a read command by a custom SFTP server. The process shown in FIG. 8 is performed by a cloud based distributed SFTP server cluster, executing on a computing device, such as the cloud based distributed SFTP server cluster 102 in FIG. 1.

The process begins by receiving a read (GET) command at 802. The SSO authentication service performs an authentication of the request at 804. A determination is made whether the authentication is successful at 806. If yes, the server performs a registry lookup at 808. The lookup involves checking one or more entries in a registry lookup table in a cloud database. A determination is made whether the appropriate entries containing metadata needed to respond to the request is found at 810. If yes, the requested data is read directly from the storage location on the cloud storage and downloaded to the requesting client at 812. The response is returned at 814. The process terminates thereafter.

While the operations illustrated in FIG. 8 are performed by a cloud service, aspects of the disclosure contemplate performance of the operations by other entities. In a non-limiting example, a computing device performs one or more of the operations. In another example, one or more computer-readable storage media storing computer-readable instructions may execute to cause at least one processor to implement the operations illustrated in FIG. 8.

Figure 9:
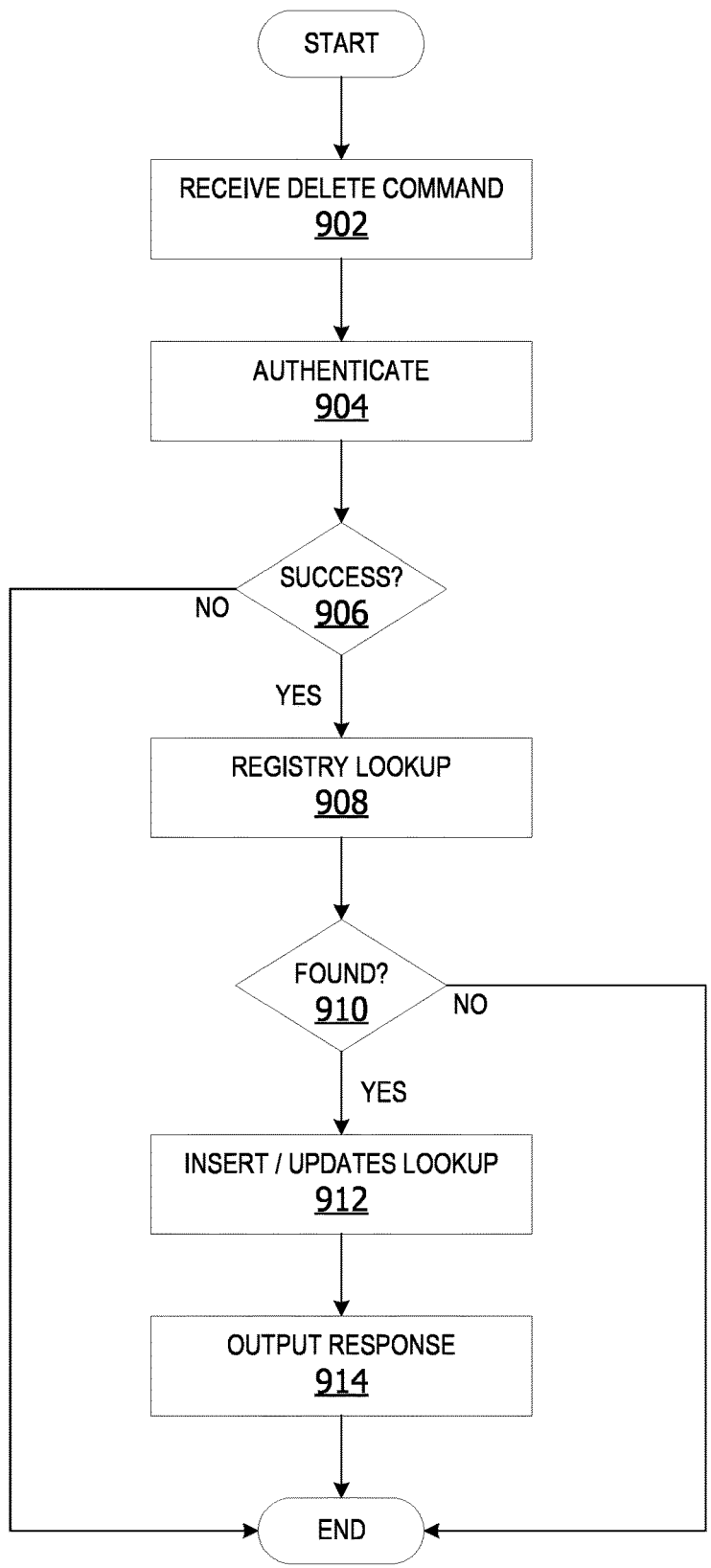
FIG. 9 is an exemplary flow chart illustrating operation of the computing device to process a delete command by a custom SFTP server.

FIG. 9 is an exemplary flow chart illustrating operation of the computing device to process a delete command by a custom SFTP server. The process shown in FIG. 9 is performed by a cloud based distributed SFTP server cluster, executing on a computing device, such as the cloud based distributed SFTP server cluster 102 in FIG. 1.

The process begins by receiving a delete command at 902. An authentication is performed at 904. The authentication may be performed by a SSO service. A determination is made whether the authentication is successful at 906. If yes, a registry lookup is performed at 908. If a registry entry for the file to be deleted is found at 910, the registry update inserts an update into the registry entry indicating the given file is deleted. However, the actual file is maintained in the cloud storage. This enables the deleted file to later be restored if desired. A response indicating the successful completion of the delete operation is output to the client user device at 914. The process terminates thereafter.

While the operations illustrated in FIG. 9 are performed by a cloud service, aspects of the disclosure contemplate performance of the operations by other entities. In a non-limiting example, a computing device performs one or more of the operations. In another example, one or more computer-readable storage media storing computer-readable instructions may execute to cause at least one processor to implement the operations illustrated in FIG. 9.

Figure 10:
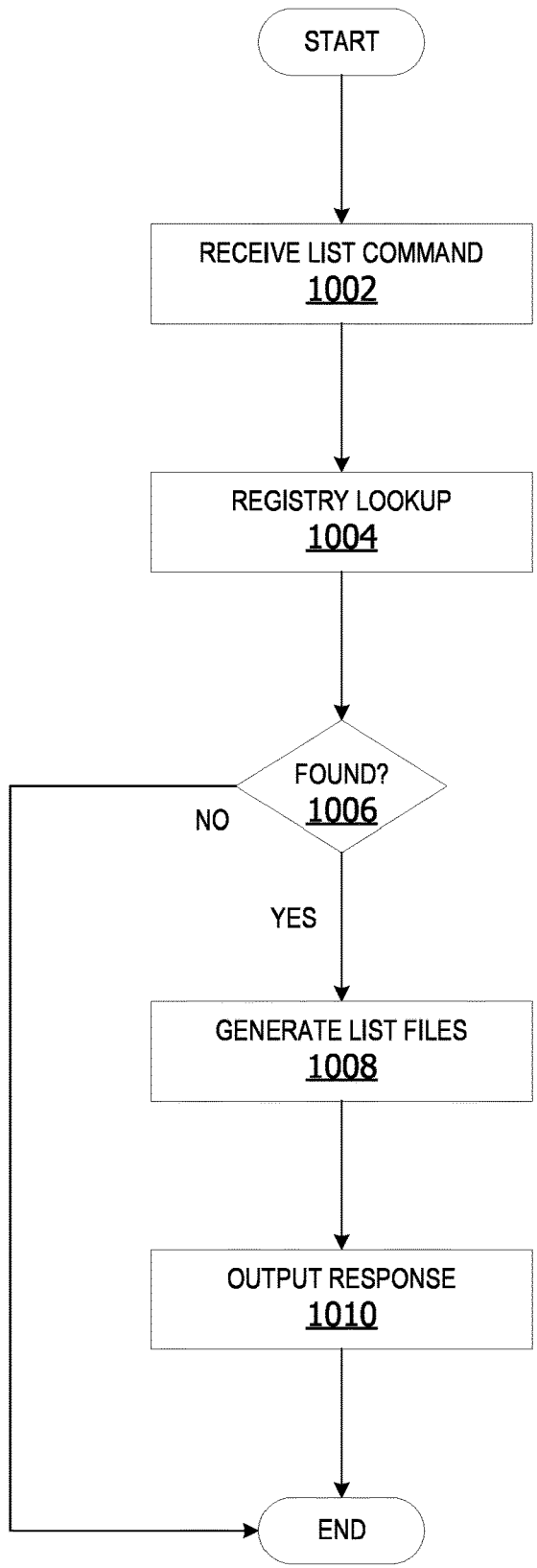
FIG. 10 is an exemplary flow chart illustrating operation of the computing device to process a list command by a custom SFTP server.

FIG. 10 is an exemplary flow chart illustrating operation of the computing device to process a list command by a custom SFTP server. The process shown in FIG. 10 is performed by a cloud based distributed SFTP server cluster, executing on a computing device, such as the cloud based distributed SFTP server cluster 102 in FIG. 1.

A LIST command is received at 1002. A registry table lookup is performed at 1004. A determination is made whether metadata responsive to the request is found in the registry lookup at 1006. If yes, a list of the files is generated at 1008. The response, including the list of files or other resources obtained from the registry table, is output in the response at 1010. The process terminates thereafter.

While the operations illustrated in FIG. 10 are performed by a cloud service, aspects of the disclosure contemplate performance of the operations by other entities. In a non-limiting example, a computing device performs one or more of the operations. In another example, one or more computer-readable storage media storing computer-readable instructions may execute to cause at least one processor to implement the operations illustrated in FIG. 10.

Figure 11:
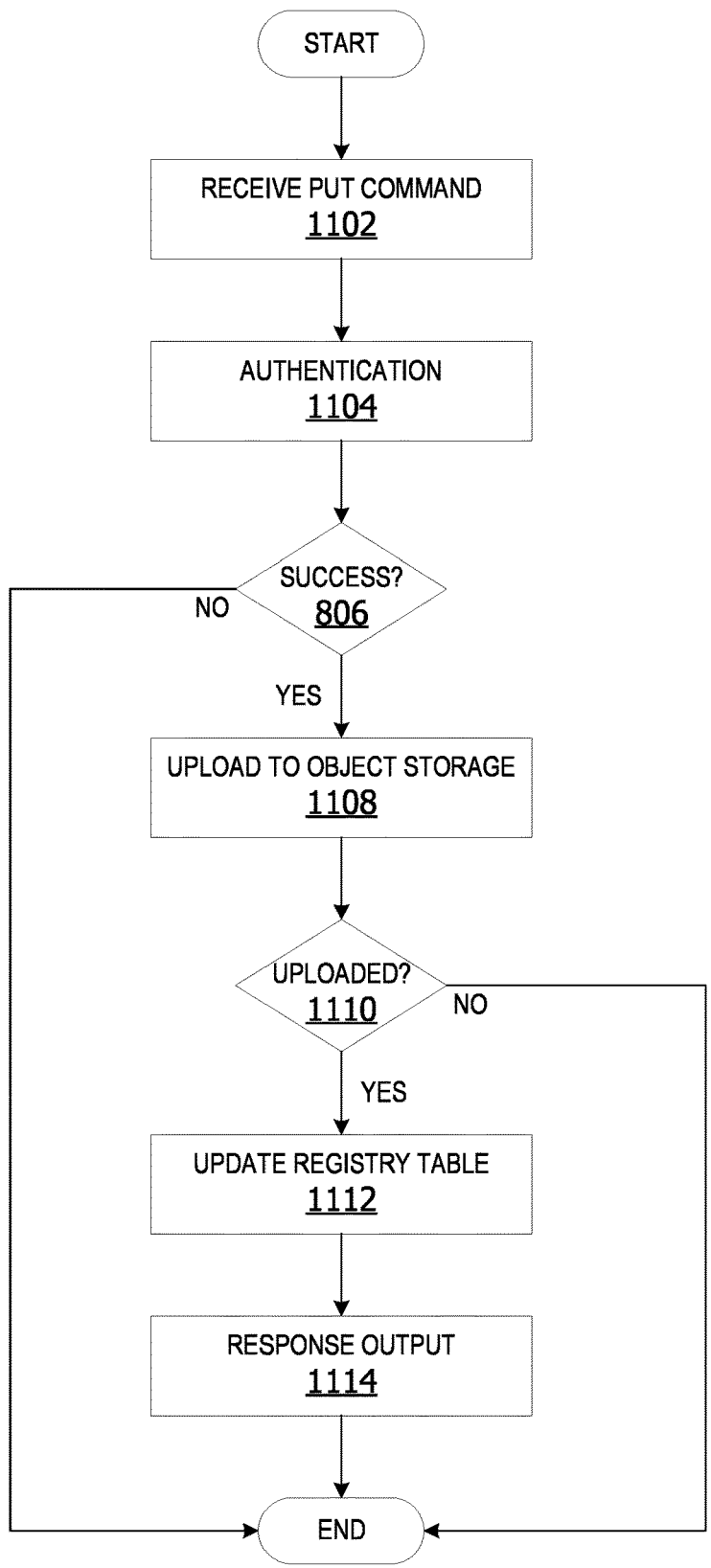
FIG. 11 is an exemplary flow chart illustrating operation of the computing device to process a put command by a custom SFTP server.

FIG. 11 is an exemplary flow chart illustrating operation of the computing device to process a put command by a custom SFTP server. The process shown in FIG. 11 is performed by a cloud based distributed SFTP server cluster, executing on a computing device, such as the cloud based distributed SFTP server cluster 102 in FIG. 1.

A PUT command request is received at 1102. Authentication is performed at 1104. A determination is made whether the authentication of the client request is successful at 1106. The data associated with the PUT request is uploaded to the object storage at 1108. A determination is made whether the data is uploaded at 1110. If yes, the registry table is updated at 1112. The response is output at 1114. The response, in some examples, includes an indication that the write operation was completed successfully. The process terminates thereafter.

While the operations illustrated in FIG. 11 are performed by a cloud service, aspects of the disclosure contemplate performance of the operations by other entities. In a non-limiting example, a computing device performs one or more of the operations. In another example, one or more computer-readable storage media storing computer-readable instructions may execute to cause at least one processor to implement the operations illustrated in FIG. 11.

FIG. 12 is an exemplary diagram illustrating a registry table 1200. The registry table 1200 includes metadata describing the data stored in the cloud object storage. The registry table 1200, in this non-limiting example, includes a username 1202, an outbound folder_path 1204, a file_name 1206, created time 1208, file_path at 1210 and current status 1212. The file_name 1206 is the name of the file. The created time 1208 is the date and/or time at which the file was created, updated, deleted, or otherwise accessed. The file_path 1210 is a pointer indicating the location of the data within the cloud storage.

FIG. 13 is an exemplary key-based authentication code 1300. The key-based authentication code 1300 includes a non-limiting example of authentication using a username and an authentication key for authenticating the client request by the SSO service.

FIG. 14 is an exemplary user-based authentication code 1400. The user-based authentication code 1400 is a non-limiting example of authentication using a username and password for authenticating the client request by the SSO service.

Figure 15:
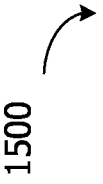
FIG. 15 is an exemplary registry configuration code.

FIG. 15 is an exemplary registry configuration code 1500. The registry configuration code 1500 is a non-limiting example of code for configuring a registry table entry.

Additional Examples

In some examples, the system provides a cloud based distributed SFTP server that uses cloud storage as its persistence layer i.e., SFTP server local storage is not used for data storage. By doing this, the dependency of local virtual machine (VM) is removed from the server. The distributed nature of the system further provides unlimited scaling for the system.

The cloud SFTP servers have no dependency on physical boxes, all the SFTP servers reside on individual VMs behind a load balancer. There is no need to purchase expensive storage for each SFTP server. Moreover, in the distributed system, adding or removing servers is easy for the cloud SFTP server. The relative ease of adding or removing VMs makes the system scalable, flexible, and robust.

The system, in other examples, is resilient and fault tolerant. Data is stored in a centralized cloud storage instead of storing the data on local storage of a single SFTP server. The load balancer permits loads to be shifted to any server in the cluster to ensure only working SFTP servers receive traffic, which helps to reduce server downtime to provide improved performance and reliability over traditional SFTP servers.

In still other examples, data is streamed directly from the cloud-based object storage to the client. This reduces the amount of physical storage required by the servers for reduced costs while further improving scalability. SFTP server operations and file size are not limited due to hardware or virtual machine capacity.

The system provides a seamless experience to the client via the user interface. The user experience is the same with respect to the information/view presented to the user on the user interface as the user would experience using traditional SFTP server. In other words, a user experience is the same via the user interface regardless of whether the request is responded to by a cloud SFTP server or a traditional SFTP server. Thus, the system mimics the real operations of traditional SFTP servers.

In an example scenario, when a user logs into an SFTP server on the system, the user is able to be authenticated using the same authentication data and access the user's data on the cloud storage seamlessly, regardless of which server in the cluster the user happens to have been routed to by the load balancer. The system provides single profile onboarding and lightweight directory access protocol (LDAP) authenticated.

In other examples, the system is deployed in cloud virtual machines as a virtual SFTP behind a global load balancer. All users login to a specific folder, such as, but not limited to, an SFTP root folder, where each user has their own folder. As the first step, in this example, client authentication and registration take place via single sign on performed through identity and access management (IAM) based on the credentials entered by the client during connection establishment. After registration, folder establishment process occurs. A dedicated folder structure is created to standardize the process, i.e., inbound, and outbound. Inbound folder is used to put files, and outbound folder is used to do the rest of the operations, such as get, list and deleted. Upon successful login, the client is redirected to root folder to perform their own set of operations. Customer server intercepts each command. All the interactions are performed virtually done by the server using other components. Registry persists state of inbound transactions to make the state available across the cluster of SFTP servers in the system. Cassandra (NoSQL) persistence is used to achieve the registry capability and highly scalable. Thus, dependency of local VMs is removed by having this registry. Any server who has access to registry table and object storage is able to fulfill the client sftp request. The user experience is the same across all the servers for continuity and consistency between traditional SFTP servers and the cloud based SFTP servers.

In still other examples, all the cloud SFTP server hosts are configured in a cluster that is tagged to a load balancer alias. Clients establish connection through the alias to reach a particular server. Health of the server is tagged to the load balancer hence, it ensures the high availability and reliability of the system by sending requests only to the servers that are available, and it provides the flexibility to scale the system.

An authenticator, in yet other examples, provides a unified authorization mechanism across servers without any manual configurations or code change. It enables SSO providers with IAM as the authorization provider. The client onboarding process and disabling are tagged to the LDAP directory, hence system level dependency is reduced to a great extent while it enhances security during client termination as the changes take effect within the system immediately across all the servers.

Alternatively, or in addition to the other examples described herein, examples include any combination of the following:
  wherein the client request comprises a get command;
  checking a registry table for a pointer to a storage location on the cloud storage; and steam download data responsive to the get command from the storage location directly to the requesting client, wherein the requesting client is logged into the assigned SFTP server, and wherein the download data is absent from local physical storage associated with the assigned SFTP server;
  wherein the client request comprises a delete command requesting deletion of a selected file;
  updating a status of a selected file in the registry table to a deleted file status, wherein the file is maintained within the cloud storage for retrieval if the delete command is rescinded;
  wherein the client request comprises a put command;
  streaming, by an interceptor, upload of data associated with the put command into cloud storage; and storing a pointer to the uploaded data to an entry in the registry table;
  wherein the client request comprises a list command;
  retrieving a list of files responsive to the list command from the registry table; and returning the list of files to the requesting client;
  providing a consistent and seamless end-user experience from each SFTP server in the set of servers via a user interface; and
  streaming inbound and outbound data between the client user device and the cloud object storage through a live pipe.

At least a portion of the functionality of the various elements in FIG. 1, FIG. 2, FIG. 3, FIG. 4, and FIG. 5 can be performed by other elements in FIG. 1, FIG. 2, FIG. 3, FIG. 4, and FIG. 5, or an entity (e.g., processor 306, web service, server, application program, computing device, etc.) not shown in FIG. 1, FIG. 2, FIG. 3, FIG. 4, and FIG. 5.

In some examples, the operations illustrated in FIG. 6, FIG. 7, FIG. 8, FIG. 9, FIG. 10, and FIG. 11 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of responding to client requests, the method comprising assigning an incoming client request to an available SFTP server within a set of servers associated with a cloud based distributed SFTP server cluster; authenticating the client request based on authentication data for a user included within the client request; accessing a set of records in a centralized registry table associated with the user using user-provided data obtained from the client request; performing a set of file-related actions associated with at least one of the set of records stored on the registry table or the set of files stored on a cloud object storage responsive to the client request; and updating the set of records in the registry table to reflect the performed set of file-related actions, wherein a state of each file-related actions performed with regard to a file stored on the cloud storage is maintained on the centralized registry table providing stateless cloud VMs.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. In some examples, the program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for handling client requests by SFTP servers. For example, the elements illustrated in FIG. 1, FIG. 2, FIG. 3, FIG. 4, and FIG. 5, such as when encoded to perform the operations illustrated in FIG. 6, FIG. 7, FIG. 8, FIG. 9, FIG. 10 and FIG. 11, constitute exemplary means for assigning an incoming client request to an available SFTP server within a set of available servers associated with a cloud based distributed SFTP server cluster; exemplary means for authenticating the client request based on authentication data for a user included within the client request; exemplary means for accessing a set of records in a centralized registry table associated with the user using user-provided data obtained from the client request; exemplary means for performing a set of file-related actions associated with at least one of the set of records stored on the registry table or the set of files stored on a cloud object storage responsive to the client request; and exemplary means for updating the set of records in the registry table to reflect the performed set of file-related actions.

Other non-limiting examples provide one or more computer storage devices having a first computer-executable instructions stored thereon for providing responses to client requests via a cloud based SFTP server cluster. When executed by a computer, the computer performs operations including assigning an incoming client request to an available SFTP server within a set of servers associated with a cloud based distributed SFTP server cluster; authenticating the client request based on authentication data for a user included within the client request; accessing a set of records in a centralized registry table associated with the user using user-provided data obtained from the client request; performing a set of file-related actions associated with at least one of the set of records stored on the registry table or the set of files stored on a cloud object storage responsive to the client request; and updating the set of records in the registry table to reflect the performed set of file-related actions, wherein a state of each file-related action performed with regard to a file stored on the cloud storage is maintained on the centralized registry table providing stateless cloud VMs.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for responding to client requests via a set of cloud-based distributed secure file transfer protocol (SFTP) servers, the computer-implemented method comprising:
   storing, in a centralized registry table, a set of records describing a set of files, wherein the set of records include a name of a file and a pointer indicating a storage location of the file on cloud a cloud based object storage;
   monitoring, by a load balancer, a health status of each SFTP server within a set of servers associated with a cloud-based distributed SFTP server cluster, each SFTP server within the set of servers residing on an individual virtual machine (VM) associated with a cloud server, the health status indicating each SFTP server as either available or unavailable;
   assigning, by the load balancer, a client request of a client user device to an SFTP server within the set of servers having the health status of available;
   accessing, by an interceptor of the assigned SFTP server, the set of records stored in the centralized registry table, wherein the set of records is accessible by any SFTP server in the cloud-based distributed SFTP server cluster;
   performing, by the assigned SFTP server via a network, a set of file-related actions associated with at least one of the set of records stored on the centralized registry table or the set of files stored on the cloud storage responsive to the client request;
   responsive to performance of the set of file-related actions associated with processing the client request, updating the set of records in the centralized registry table to reflect the set of file- related actions, wherein a state of each file-related action performed with regard to the set of files stored on the cloud storage is maintained on the centralized registry table providing stateless cloud VMs;
   checking the centralized registry table for the pointer to a storage location of the file on the cloud storage, the storage location on the cloud storage being independent from local physical storage associated with the assigned SFTP server; and
   streaming, in response to a get command included in the client request, download data of the file directly from the storage location on the cloud storage to the client user device without storing the download data of the file on local physical storage of the assigned SFTP server, wherein the client user device is logged into the assigned SFTP server, and wherein the download data of the file is absent from local physical storage associated with the assigned SFTP server.

2. The computer-implemented method of claim 1, wherein the client request comprises a delete command requesting deletion of a selected file, and further comprising:
   updating a status of a selected file in the centralized registry table to a deleted file status, wherein the file is maintained within the cloud storage for retrieval if the delete command is rescinded.

3. The computer-implemented method of claim 1, wherein the client request comprises a put command, and further comprising:
   streaming, by the interceptor, upload of data associated with the put command into the cloud storage; and
   storing the pointer to the uploaded data to an entry in the centralized registry table.

4. The computer-implemented method of claim 1, wherein the client request comprises a list command, and further comprising:
   retrieving a list of files responsive to the list command from the centralized registry table; and
   returning the list of files to the client user device.

5. The computer-implemented method of claim 1, further comprising:
   authenticating, via a single sign-on (SSO) service, the client request based on authentication data for a user included within the client request, the client request received from the client user device, wherein the authentication data is utilized by the SSO service to authenticate the client request for processing by any server within the cloud based distributed SFTP server cluster.

6. The computer-implemented method of claim 1, further comprising:
streaming inbound and outbound data between the client user device and the cloud storage through a live pipe, the streamed data associated with the updated set of records; and
providing a consistent and seamless end-user experience from each SFTP server in the set of available servers via a user interface,
wherein the live pipe is a network tunnel between the client user device and the cloud storage.

7. A system for responding to client requests via a cloud based distributed secure file transfer protocol (SFTP) server cluster, the system comprising:
network devices including at least a load balancer and a set of servers, wherein the network devices of the system are collectively configured to:
store, in a centralized registry table, a set of records describing a set of files, wherein the set of records include a name of a file and a pointer indicating a storage location of the file on cloud storage;
monitor a health status of each SFTP server within a set of servers associated with a cloud-based distributed SFTP server cluster, each SFTP server within the set of servers residing on an individual virtual machine (VM) associated with a cloud server, the health status indicating each SFTP server as either available or unavailable;
assign a client request of a client user device to an SFTP server within the set of servers having the health status of available;
access, at an interceptor of the assigned SFTP server, the set of records stored in the centralized registry table, wherein the set of records is accessible by any SFTP server in the cloud-based distributed SFTP server cluster;
perform, at the assigned SFTP server via a network, a set of file-related actions associated with at least one of the set of records stored on the centralized registry table or the set of files stored on the cloud storage responsive to the client request;
responsive to performance of the set of file-related actions associated with processing the client request, update the set of records in the centralized registry table to reflect the set of file-related actions, wherein a state of each file-related action performed with regard to the set of files stored on the cloud storage is maintained on the centralized registry table providing stateless cloud VMs;
check the centralized registry table for the pointer to a storage location of the file on the cloud storage, the storage location on the cloud storage being independent from local physical storage associated with the assigned SFTP server; and
stream, in response to a get command included in the client request, download data of the file directly from the storage location on the cloud storage to the client user device without storing the download data of the file on local physical storage of the assigned SFTP server, wherein the client user device is logged into the assigned SFTP server, and wherein the download data of the file is absent from local physical storage associated with the assigned SFTP server.

8. The system of claim 7, wherein the client request comprises a delete command requesting deletion of a selected file, and wherein the network devices are further configured to:
update a status of a selected file in the centralized registry table to a deleted file status, wherein the file is maintained within the cloud storage for retrieval if the delete command is rescinded.

9. The system of claim 7, wherein the client request comprises a put command, and wherein the network devices are further configured to:
stream upload of data associated with the put command from the assigned SFTP server into the cloud storage; and
store the pointer to the uploaded data to an entry in the centralized registry table.

10. The system of claim 7, wherein the client request comprises a list command, and wherein the network devices are further configured to:
retrieve a list of files responsive to the list command from the centralized registry table; and
return the list of files to the client user device.

11. The system of claim 7, wherein the network devices are further configured to:
authenticate, via a single sign-on (SSO) service, the client request based on authentication data for a user included within the client request, the client request received from the client user device, wherein the authentication data is utilized by the SSO service to authenticate the client request for processing by any server within the cloud based distributed SFTP server cluster.

12. The system of claim 7, wherein the network devices are further configured to:
stream inbound and outbound data between the client user device and the cloud storage through a live pipe, the streamed data associated with the updated set of records; and
provide a consistent and seamless end-user experience from each SFTP server in the set of available servers via a user interface,
wherein the live pipe is a network tunnel between the client user device and the cloud storage.

13. Computer storage media, having computer-executable instructions for responding to client requests via a cloud-based distributed secure file transfer protocol (SFTP) server cluster that, when executed by processors distributed across network devices of a system cause the network devices to collectively:
store, in a centralized registry table, a set of records describing a set of files, wherein the set of records include a name of a file and a pointer indicating a storage location of the file on cloud storage;
monitor a health status of each SFTP server within a set of servers associated with a cloud-based distributed SFTP server cluster, each SFTP server within the set of servers residing on an individual virtual machine (VM) associated with a cloud server, the health status indicating each SFTP server as either available or unavailable;
assign a client request of a client user device to an SFTP server within the set of servers having the health status of available;
access, at an interceptor of the assigned SFTP server, the set of records stored in the centralized registry table, wherein the set of records is accessible by any SFTP server in the cloud-based distributed SFTP server cluster;

perform, at the assigned SFTP server via a network, a set of file-related actions associated with at least one of the set of records stored on the centralized registry table or the set of files stored on the cloud storage responsive to the client request;

responsive to performance of the set of file-related actions associated with processing the client request, update the set of records in the centralized registry table to reflect the set of file-related actions, wherein a state of each file-related action performed with regard to the set of files stored on the cloud storage is maintained on the centralized registry table providing stateless cloud VMs;

check the centralized registry table for the pointer to a storage location of the file on the cloud storage, the storage location on the cloud storage being independent from local physical storage associated with the assigned SFTP server; and stream, in response to a get command included in the client request, download data of the file directly from the storage location on the cloud storage to the client user device without storing the download data of the file on local physical storage of the assigned SFTP server, wherein the client user device is logged into the assigned SFTP server, and wherein the download data of the file is absent from local physical storage associated with the assigned SFTP server.

14. The computer storage media of claim 13, wherein the client request comprises a delete command requesting deletion of a selected file, and wherein executing the computer-executable instructions further cause the network devices to:

update a status of a selected file in the centralized registry table to a deleted file status, wherein the file is maintained within the cloud storage for retrieval if the delete command is rescinded.

15. The computer storage media of claim 13, wherein the client request comprises a put command, and wherein executing the computer-executable instructions further cause the network devices to:

stream upload of data associated with the put command from the assigned SFTP server into the cloud storage; and store the pointer to the uploaded data to an entry in the centralized registry table.

16. The computer storage media of claim 13, wherein the client request comprises a list command, and wherein executing the computer-executable instructions further cause the network devices to:

retrieve a list of files responsive to the list command from the centralized registry table; and return the list of files to the client user device.

17. The system of claim 13, wherein executing the computer-executable instructions further cause the network devices to:

authenticate, via a single sign-on (SSO) service, the client request based on authentication data for a user included within the client request, the client request received from the client user device, wherein the authentication data is utilized by the SSO service to authenticate the client request for processing by any server within the cloud based distributed SFTP server cluster.

18. The system of claim 13, wherein executing the computer-executable instructions further cause the network devices to:

stream inbound and outbound data between the client user device and the cloud storage through a live pipe, the streamed data associated with the updated set of records; and provide a consistent and seamless end-user experience from each SFTP server in the set of available servers via a user interface, wherein the live pipe is a network tunnel between the client user device and the cloud storage.

* * * * *

UNITED STATES PATENT AND TRADEMARK OFFICE
CERTIFICATE OF CORRECTION

| | | |
|---|---|---|
| PATENT NO. | : 12,206,726 B2 | Page 1 of 1 |
| APPLICATION NO. | : 17/557118 | |
| DATED | : January 21, 2025 | |
| INVENTOR(S) | : ManoharReddy Vummadi et al. | |

It is certified that error appears in the above-identified patent and that said Letters Patent is hereby corrected as shown below:

In the Claims

Column 21, Claim 1, Lines 64-65 -- "a cloud based object" should be deleted.

Signed and Sealed this
Fifteenth Day of April, 2025

Coke Morgan Stewart
*Acting Director of the United States Patent and Trademark Office*